(12) United States Patent
Watanabe et al.

(10) Patent No.: US 6,261,402 B1
(45) Date of Patent: Jul. 17, 2001

(54) PLANAR TYPE LENS MANUFACTURING METHOD

(75) Inventors: Hidetoshi Watanabe, Chiba; Tomotaka Ito, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/177,799

(22) Filed: Oct. 23, 1998

(30) Foreign Application Priority Data

Oct. 24, 1997 (JP) .................................................. 9-292207

(51) Int. Cl.$^7$ .............................. B65C 1/00; B32B 33/00; B32B 18/00; B03B 21/60; B02B 5/128
(52) U.S. Cl. ...................... 156/230; 156/241; 156/276; 428/143; 428/210; 359/453; 359/536; 359/614
(58) Field of Search .................................... 156/230, 231, 156/233, 235, 239, 240, 241, 247, 277, 289, 276; 428/142, 143, 204, 210, 212; 359/452, 453, 515, 529, 536, 613, 614

(56) References Cited

U.S. PATENT DOCUMENTS

| 2,378,252 | 6/1945 | Staehle et al. ........................ 88/28.93 |
| 3,552,822 | * 1/1971 | Altman ................................. 359/453 |
| 5,563,763 | * 10/1996 | Vance ................................... 359/614 |
| 5,789,132 | * 8/1998 | Mayama et al. ...................... 430/110 |

FOREIGN PATENT DOCUMENTS

| 59-168659 | 9/1984 | (JP) | ............................. H01L/23/48 |
| 4-11558 | 4/1992 | (JP) | ............................. H01L/23/50 |
| 5-190727 | 7/1993 | (JP) | ............................. H01L/23/50 |
| 2513508 | 4/1996 | (JP) | ............................. B65G/27/32 |
| 2513508 | 7/1996 | (JP) | ............................. G03B/21/62 |
| 09100590 | 4/1997 | (JP) | ............................. G02B/3/00 |

* cited by examiner

*Primary Examiner*—Richard Crispino
*Assistant Examiner*—J. A. Lorengo
(74) *Attorney, Agent, or Firm*—Ronald P. Kananen; Rader, Fishman & Grauer

(57) ABSTRACT

A sure and efficient manufacturing method of a translucent type screen using micro glass beadsis probided. A carbon toner is scattered onto micro glass beads which are buried and fixed in a UV curable resin layer, and the carbon toner is uniformly filled in the gaps between the micro glass beads by a rotating brush or a press roll or the like. The supply and filling of the carbon toner may be simultaneously performed by an air jet nozzle. Subsequently, an extra fine fiber cloth, sticky roll or the like is continuously brought into contact with the upper surface of the carbon toner to remove the carbon toner at the light emission portion of the micro glass beads.

10 Claims, 22 Drawing Sheets

FIG. 26 (X4000)
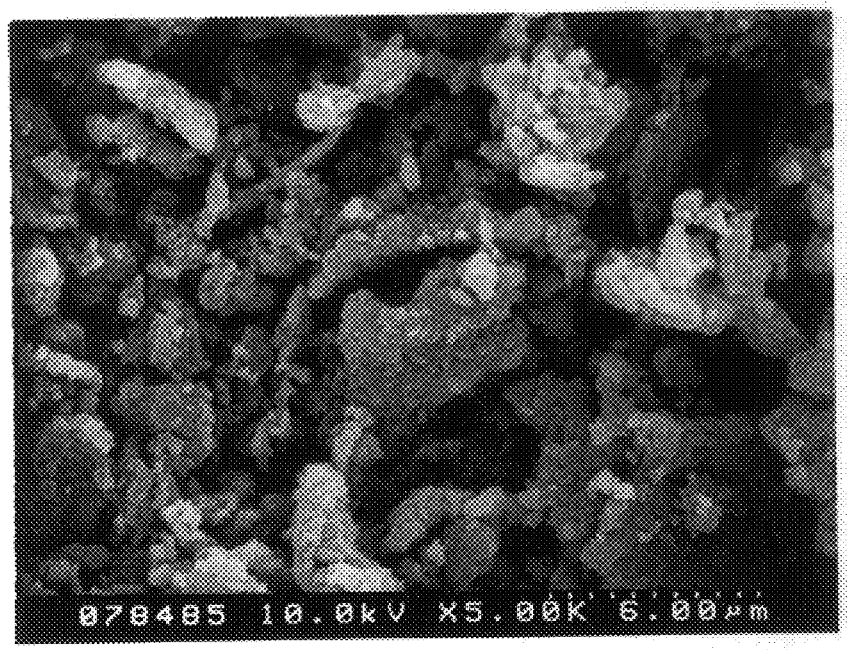
6.00μm
FIG. 27 (X800)
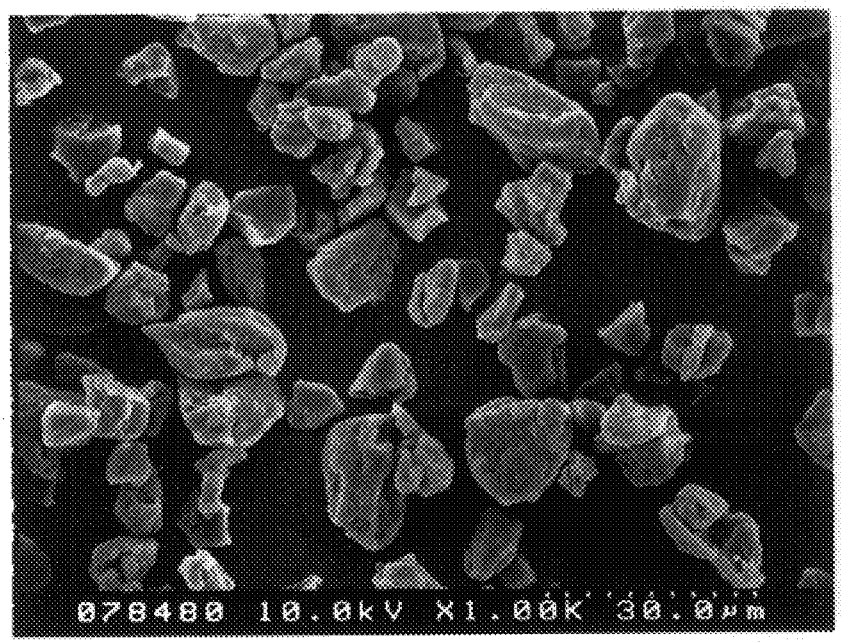
30.0μm

US 6,261,402 B1

PLANAR TYPE LENS MANUFACTURING METHOD

BACKGROUND OF THE INVENTION

The present invention relates to a method of manufacturing a planar type lens which is suitably used for a screen for a back projection type projector, for example.

Recently, a back projection type projector using a liquid crystal light valve or a CRT has been actively developed as a large-screen display for HDTV (Hi-vision), a theater or the like.

FIG. 1 schematically shows the construction of a conventional back projection type projector.

A box type projector is illustrated as an example. Projection picture light L from a picture projection unit 101, for example, is reflected by a reflection mirror 102 and guided to a translucent type screen 105. The translucent type screen 105 comprises a Fresnel lens 103, and a lenticular lens 104 which normally extends in the vertical direction. The projection picture light L which is incident from the back surface of the translucent type screen 105 is set to substantially parallel light by the Fresnel lens 103, and then diffused mainly in the horizontal direction by the lenticular lens 104.

As shown in FIGS. 2A and 2B, the lenticular lens 104 is provided with projecting portions 104a extending in the vertical direction at the back side (light emission side), and black stripes 104b which absorb external light to enhance the screen contrast are provided to the projecting portions 104a. For example, after acrylic resin is subjected to extrusion molding to have the shape of the lenticular lens 104 containing the projecting portions 104a, and then only the projecting portions 104a are subjected to black print to form the back stripes 104b.

As shown in FIG. 2B, the width w of the black stripes 104b is normally set to be 0.3 to 0.4 time of the pitch p of the lenticular lens 104.

However, in the translucent type screen using the lenticular lens as described above, a wide angle of visibility can be obtained in the horizontal direction because the light is widely diffused in the horizontal direction. However, it has a disadvantage that the angle of visibility is small in the vertical direction because the light is diffused in only the narrow range in the vertical direction. In order to overcome this disadvantage, a structure having a combination of a lenticular lens extending in the vertical direction and a lenticular lens extending in the horizontal direction is known, however, it has a problem that the part cost and the manufacturing cost rise up because of the number of parts is increased. Further, there is a problem that the thickness of the screen is increased and the weight of the screen is increased because the lamination number of the screen is increased, and also the effect of the multiple reflection between respective layers is intensified.

Further, as described above, when the black stripes are provided to enhance the contrast, it is necessary that the projecting portions for black print are provided at the light emission side of the lenticular lens, and in addition it is necessary that the projecting portions are designed to have such a width that they do not obstruct the emission light. Therefore, the area rate of the external light absorption portion based on the black stripes is normally limited to about 30 to 40%. Therefore, the effect of enhancing the contrast is relatively low.

Therefore, in place of the lenticular lens, much attention has been paid to a translucent screen based on a planar type lens which is constructed by two-dimensionally arranging transparent fine spheres (see U.S. Pat. No. 2,378,252, U.S. Pat. No. 3,552,822, Japanese Utility Model Registration No. 2513508, for example), and studies and developments thereof have been performed to practically use the translucent screen for a large-screen high-definition display.

The construction which was previously proposed by the applicant of this application in Japanese Unexamined Patent Application No. Hei-9-100590 (filed, Apr. 17, 1997) will be described with reference to FIGS. 3 to 5, for example.

FIG. 3 shows the main construction of a back projection type projector of open type. Projection picture light L from a picture projection unit 21 is diffused forwardly through a translucent type screen 10 comprising a Fresnel lens 22 and a planar type lens 23. The planar type lens 23 is constructed by two-dimensionally arranging transparent fine spheres 2 such as glass beads in a closest packed structure. Accordingly, the projection picture light L can be diffused in a wide range in each of the horizontal and vertical directions by one layer comprising the transparent fine spheres 2.

FIG. 4 shows a back projection type projector of box type, and projection picture light L from a picture projection portion 21 disposed in a housing 25 is reflected by a reflection mirror 24, and diffused forwardly through a translucent screen 10 comprising a Fresnel lens 22 and a planar type lens 23 comprising transparent fine spheres 2.

FIG. 5 shows a planar type lens having the most basic construction in ones described in the above application.

In the planar type lens 23 having the most basic construction, the many transparent fine spheres 2 such as glass beads adhere onto a transparent substrate 1 such as a glass plate or the like through a colored layer (light absorption layer) having a sticky or adhesive function. Each transparent fine sphere 2 is buried in the colored layer 3 so as to be exposed from the colored layer 3 at the light incident side by about 50% of its diameter, and brought into contact with the transparent substrate 1 at the light emission side thereof.

The incident light $L_{in}$ which is incident through the Fresnel lens (not shown) is converged by each transparent fine sphere 2 as shown in the figure, transmitted in the neighborhood of the contact portion between each transparent fine sphere 2 and the transparent substrate 1, diffused and emitted. $L_{out}$ represents emitted light. On the other hand, most of external light $L_{ex}$ which is incident from the transparent substrate 1 side is absorbed by the colored layer 3, and thus reduction in contrast due to reflection of the external light $L_{ex}$ is suppressed.

At this time, in the planar type lens 23, the area rate of the light absorption layer at the light emission side by the colored layer 3 can be set to about 80% or more, for example. Accordingly, the reduction in contrast due to the reflection of the external light $L_{ex}$ can be greatly suppressed, and thus there can be implemented a screen which is hardly affected by the external light and has high contrast.

In the above application, the planar type lens 23 is manufactured as follows.

That is, first, the colored layer 3 serving as a sticky or adhesive layer is formed on the transparent substrate 1, and many transparent fine spheres 2 are scattered onto the colored layer 3. Thereafter, the transparent fine spheres 2 are pressed from the upper side thereof so as to be pushed into the colored layer 3.

According to such a method, however, when the transparent fine spheres 2 are pressed from the upper side thereof, the transparent fine spheres 2 are rotated, and thus the colored layer 3 adheres to the surface of the exposed portion, thereby inducing reduction in transmittance, thus reduction in brightness of the screen is induced.

Further, there are some portions where the colored layer 3 remains at a thickness of about several μm between the transparent fine spheres 2 and the transparent substrate 1, so that the reduction of the transmittance, and thus the reduction in brightness of the screen is induced.

Further, it is normally needed to increase the temperature in order to reduce the viscosity of the colored layer 3 when the transparent fine spheres 2 are pushed in, and thus relatively large-scale facilities are needed to increase the temperature and cool. Further, occurrence of warpage of the transparent substrate 1 due to heat is a problem which cannot be neglected particularly for the large-screen display.

SUMMARY OF THE INVENTION

Therefore, an object of the present invention is to provide a planar type lens manufacturing method which can manufacture a planar type lens comprising transparent fine spheres without reducing the transmittance thereof and with no occurrence of warpage.

In order to achieve the above-described object, the planar type lens manufacturing method according to the present invention comprises: a step of forming a transparent sticky layer on a transparent base; a step of supplying plural transparent fine spheres onto the transparent sticky layer; a step of burying the plural transparent fine spheres in the transparent sticky layer in a depth which is substantially equal to the half of the diameter thereof; a step of supplying colored material so that the colored material is filled in at least the gaps between the plural transparent fine spheres; and a step of removing the colored material located at at least light-transmissible positions of the opposite side to the transparent base.

BRIEF DESCRIPTION OF THE DRAWINGS

FIG. 26 is a sketch diagram based on an electron microscope photograph of carbon toner of 0.05 to 0.2 μm in particle size;

FIG. 27 is a sketch diagram based on an electron microscope photograph of carbon toner of 2 to 15 μm in particle size.

DESCRIPTION OF THE PREFERRED EMBODIMENTS

A preferred embodiment according to the present invention will be described.

Figure 3:
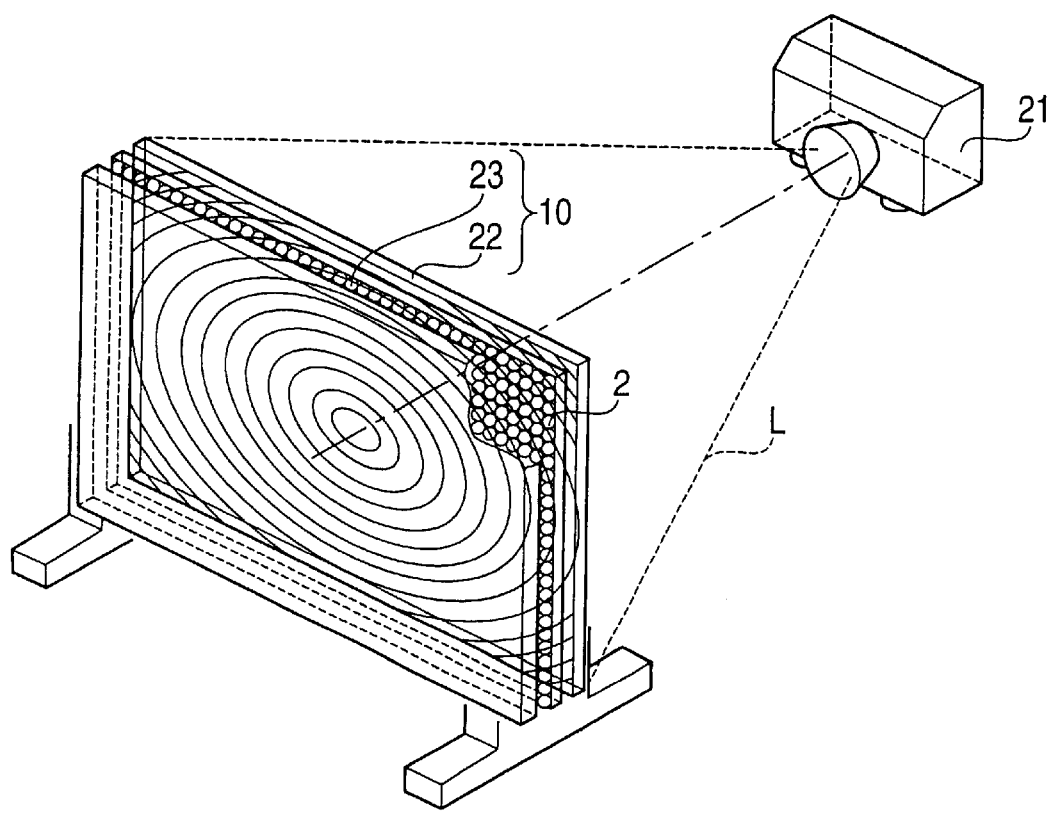
FIG. 3 is a schematic diagram showing a back projection type projector of open type using the planar type lens based on the transparent fine spheres.
Figure 4:
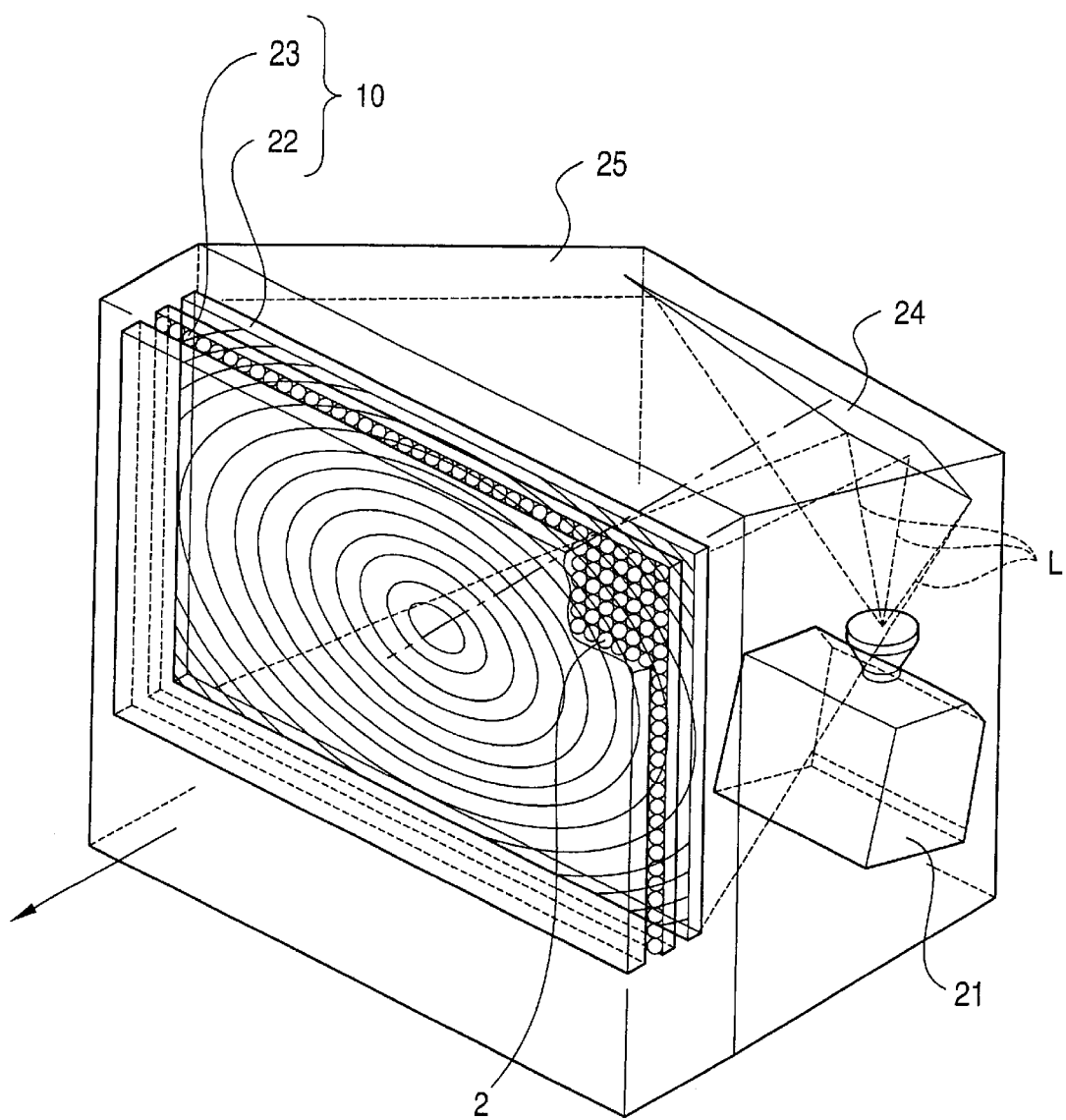
FIG. 4 is a schematic diagram showing a back projection projector of box type using the planar type lens based on the transparent fine spheres.
Figure 5:
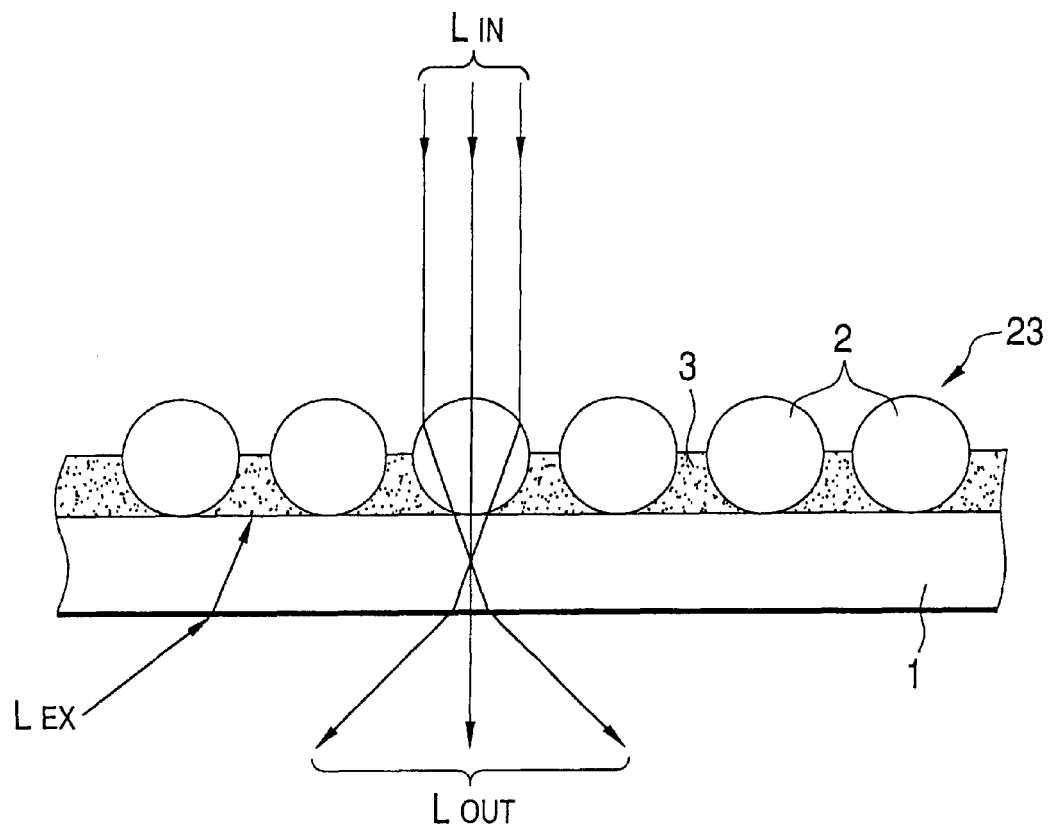
FIG. 5 is a cross-sectional view showing the basic construction of the planar type lens based on the transparent fine spheres.

In the following embodiment, the portions corresponding to the construction described with reference to FIGS. 3 to 5 are represented by the same reference numerals.

FIG. 6 schematically shows the most basic construction of a planar type lens manufactured by a manufacturing method according to the present invention.

Figure 6A:
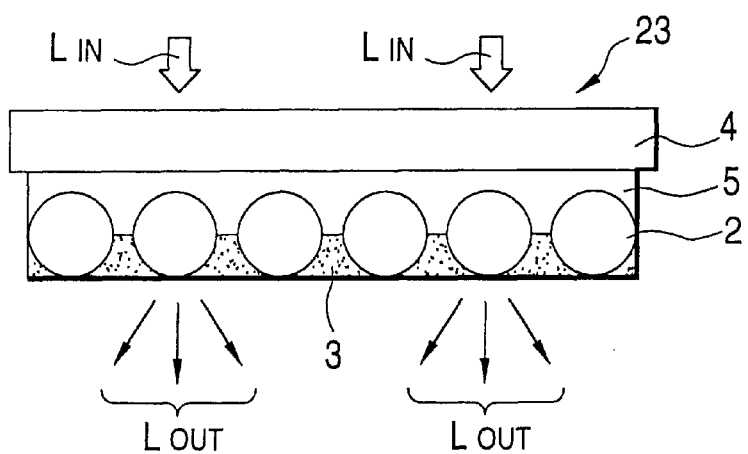
FIGS. 6A and 6B each is a cross-sectional view showing the most basic construction of a planar type lens manufactured by a manufacturing method according to the present invention.

As shown in FIG. 6A, in the planar type lens 23, a transparent base 4 having rigidity or flexibility which is formed of a glass plate, a plastic plate or the like, for example, is provided at the light incident side.

The base material 4, a sticky layer 5, fine spheres 2 described later, etc. are not necessarily required to be perfectly transparent insofar as most of targeted light can be transmitted therethrough, and thus in this specification, the term "transparent" is used as containing the degree of transparency which is extended to semi-transparency.

A transparent sticky layer 5 having a sticky and adhesive function such as UV (ultraviolet) curing resin or the like is provided on the surface of the light emission side of the transparent base 4, and many transparent fine spheres 2 formed of glass beads or the like are buried and held in the transparent sticky layer 5. Further, a colored (black) layer 3 for external light absorption which is formed of carbon toner or the like is filled in the gaps between these transparent fine spheres 2 at the light emission side As is clearly shown in FIG. 6B with being enlarged, each transparent fine sphere 2.is buried in the transparent sticky layer 5 by about a half of the diameter thereof (for example, d=50 μm) at the light incident side. On the other hand, at the light emission side, each transparent fine sphere 2 is exposed from the colored layer 3 by a predetermined thickness (for example, t=2.5 μm) to form a light emission portion having a predetermined diameter (for example, s=21.6 μm).

FIG. 7 shows a more practical structure of the planar type lens 23.

Figure 6B:
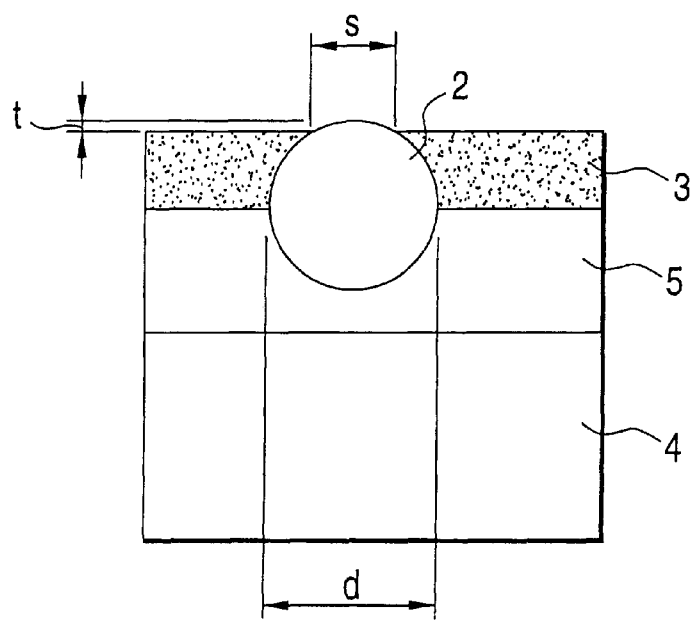
Figure 7A:
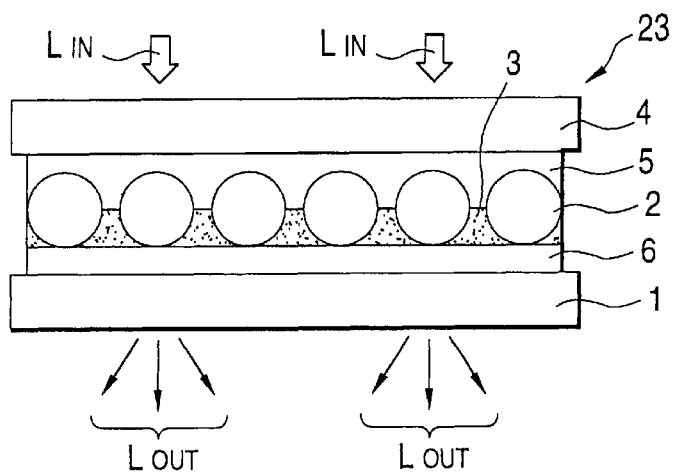
FIGS. 7A and 7B each is a cross-sectional showing the practical construction of the planar type lens manufactured by the manufacturing method according to the present invention.

In this structure, as shown in FIG. 7A, in the basis structure shown in FIG. 6, a transparent base 1 is also laminated through a transparent sticky layer 6 at the light emission side. These transparent sticky layer 6 and transparent base 1 may be formed of the same materials as the transparent sticky layer 5 and the transparent base 4 at the light incident side.

By the structure of sandwiching the transparent fine spheres 2 from both the sides thereof, enhancement of the holding strength of the transparent fine spheres 2 and protection of the transparent fine spheres 2 and the colored layer 3 from the outside can be achieved.

Figure 7B:
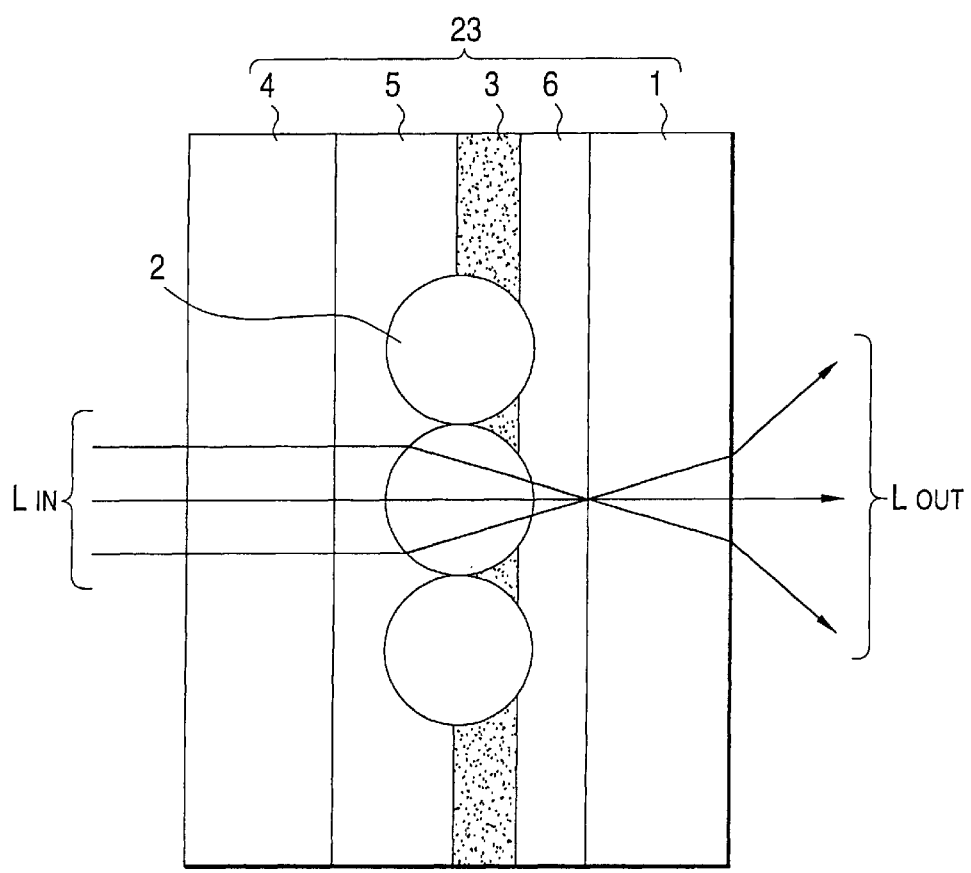

FIG. 7B schematically shows the operation of the planar type lens 23.

The incident ling $L_{in}$ which is set to substantially parallel light is incident through the transparent base 4 and the transparent sticky layer 5 at the light incident side into each transparent fine sphere 2, and light which are converged by these fine spheres 2 is passed through the transparent sticky layer 6 and the transparent base 1 at the light emission side and diffused and emitted forwardly as emission light $L_{out}$.

At this time, many incident light beams $L_{in}$ are incident to the respective transparent fine spheres 2 because each transparent fine sphere 2 is buried in the transparent sticky layer 5 by about a half of the diameter thereof. On the other hand, at the light emission side, only the limited area through which light passes is exposed from the colored layer 3. Accordingly, in the planar type lens 23, the area rate of the colored layer 3 at the light emission side can be increased while the light transmission amount, that is, the brightness in the translucent type screen is set to be high, so that the reduction of the contrast due to reduction of external light can be greatly suppressed.

Figure 8A:
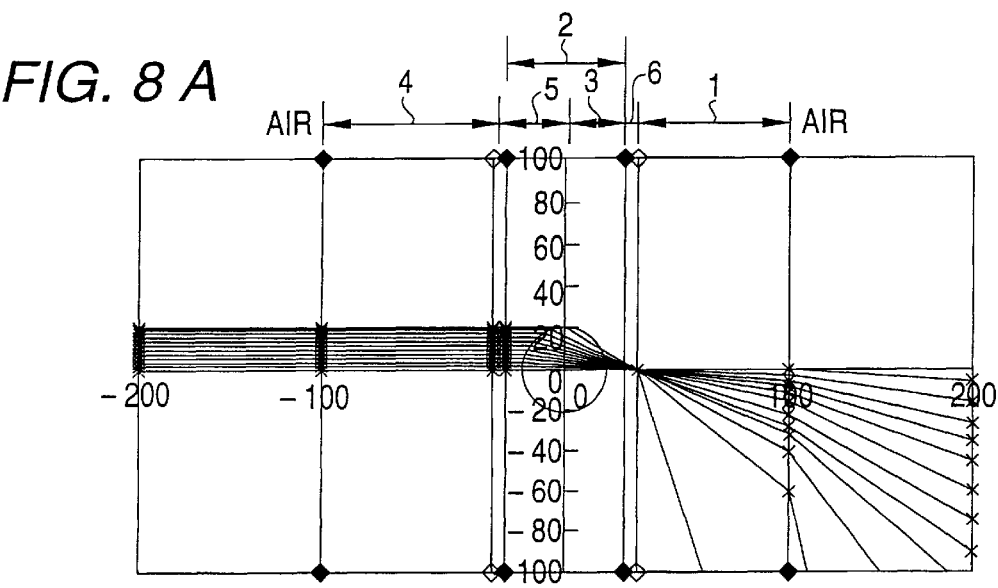
FIG. 8A to 8C each is a graph showing a light beam tracking and a simulation result of a screen gain in the planar type lens manufactured by the manufacturing method according to the present invention.
Figure 8B:
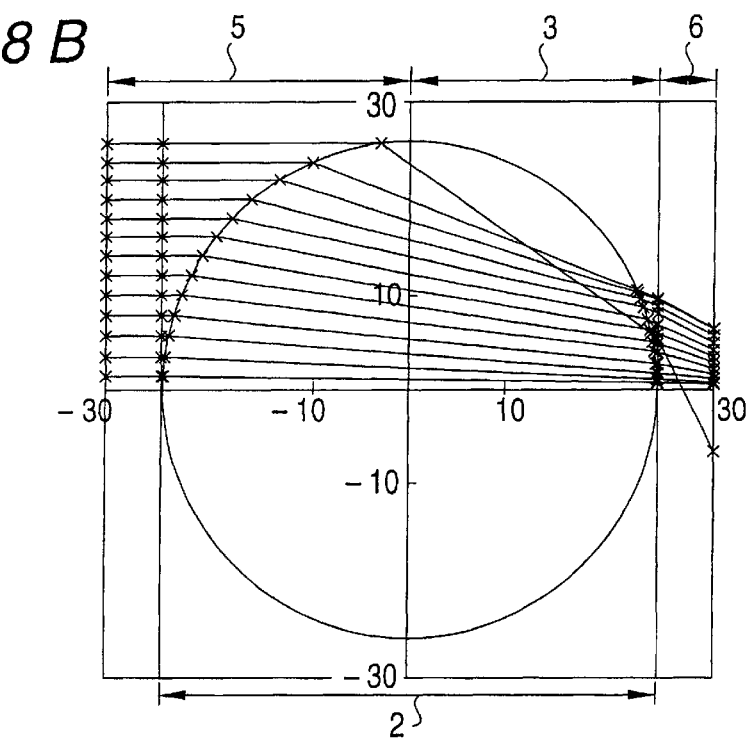
Figure 8C:
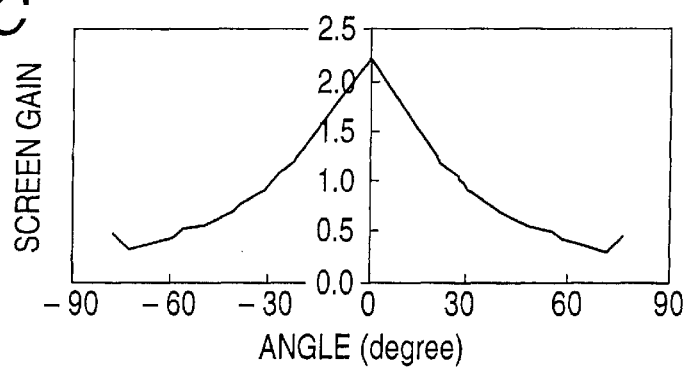

FIG. 8 shows results when a light beam tracking and a simulation of a screen gain in the planar type lens 23 having the construction shown in FIG. 7 were performed.

The calculation was made on the condition that the transparent base 4, 1 was formed of polymethyl methacrylate (PMMA) of refractivity n=1.490 the transparent sticky layer 5, 6 was formed of acrylic UV curing resin of refractivity n=1.490, and the transparent fine spheres 2 were formed of glass beads having refractivity n=1.900. The refractivity of air n=1.000.

The thickness of each layer was set to 100 μm for the transparent base 4, 1, 30 μm for the transparent sticky layer 5, 25 μm for the colored layer 3 of carbon toner, and 5 μm for the transparent sticky layer 6, and the transparent fine spheres 2 were constructed so that the diameter thereof was set to 50 μm and they were buried into the transparent sticky layer 5 by a half of the diameter, 25 μm. The transmittance of all the layers, except for the colored layer 3, was set to 100%.

As shown in FIG. 8A and FIG. 8B which is an enlarged view of FIG. 8A, the light emission portion of the transparent fine sphere 2 has an area, and in this case, it is a circle of about 10.8 μm in radius. Accordingly, it is apparent as shown in FIG. 6B that the optical loss can be minimized by exposing from the colored layer 3 a portion having a diameter s=21.6 μm or more of each transparent fine sphere 2. In order to expose from the colored layer 3 the portion having the diameter s=21.6 μm or more, it is necessary to remove the portion of the colored layer 3 which is located in the depth t=2.5 μm or more from the top of each transparent fine sphere 2.

Figure 1:
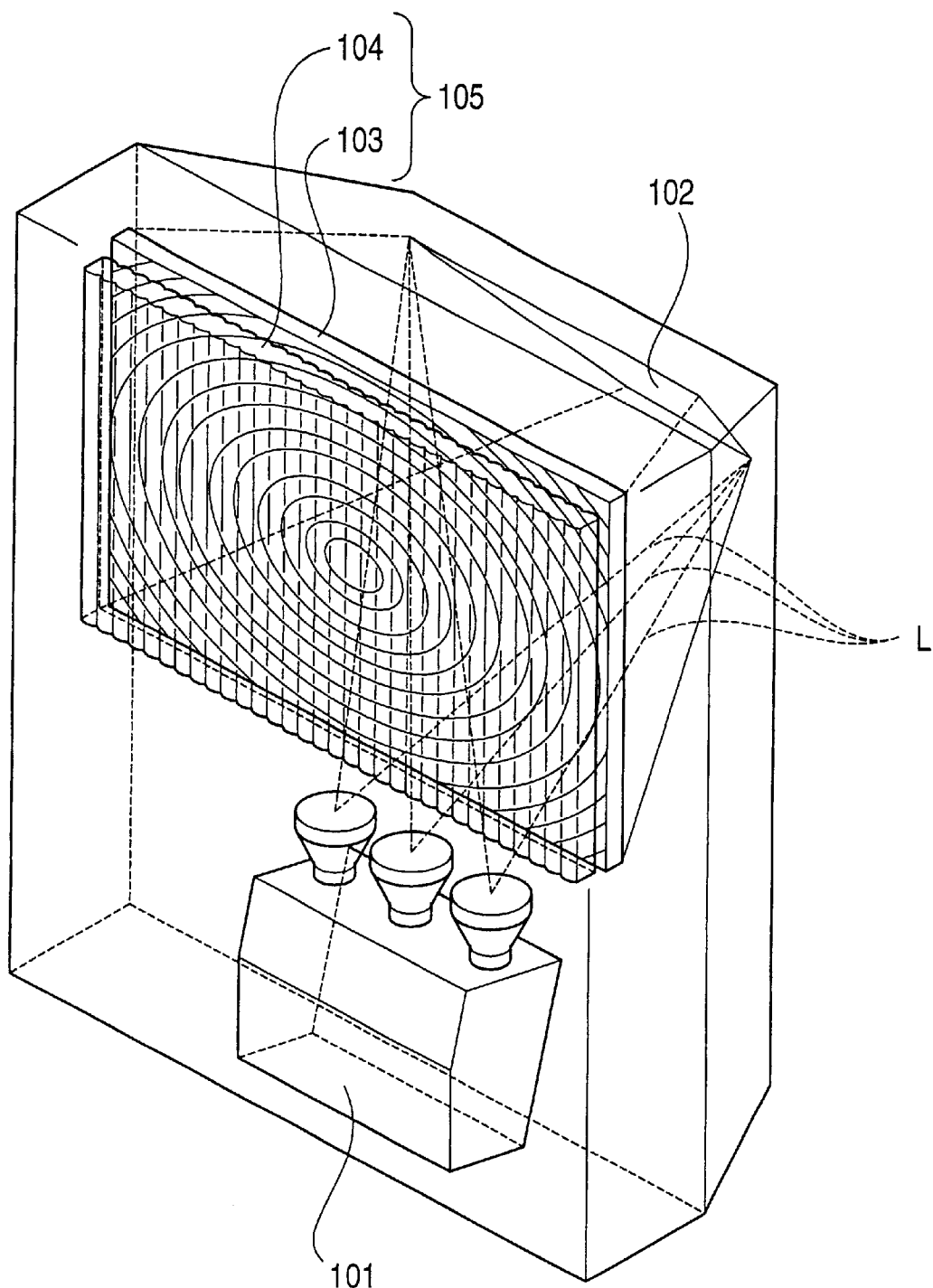
FIG. 1 is a schematic diagram showing a conventional back projection type projector.
Figure 2A:
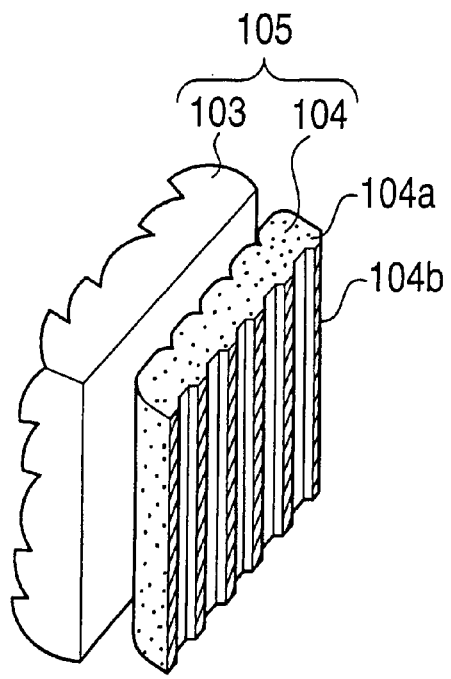
FIGS. 2A and 2B each is a schematic diagram and a cross-sectional view showing the construction of a lenticular lens in the conventional back projection type projector.
Figure 2B:
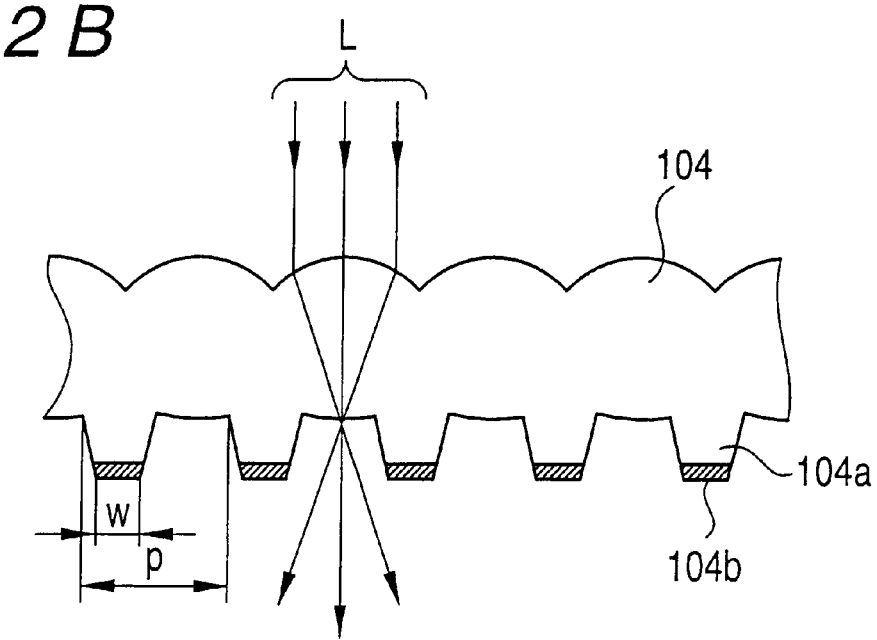

Here, assuming that the plane filling rate of the transparent fine sphere 2 is set to 90%, the area rate of the black portion of the screen which is viewed from the light emission side is represented by:

$$1-\{0.9\times(21.6/50.0)^2\}\approx 0.83.$$

and it is equal to about 83%. That is, for example, the black portion area rate of the conventional translucent type screen in which the black stripes are provided to the lenticular lens shown in FIG. 2 is ordinarily limited to about 30 to 40%, however, the translucent type screen using the planar type lens 23 can greatly increase the black portion area rate. Accordingly, a clear image can be obtained while the reduction of contrast due to reflection of external light is little.

FIG. 8B shows variation of the screen gain in the light emission direction.

In the figure, the abscissa represents the emission angle (degree) of emitted light, and the ordinate represents the screen gain (=brightness in an emission angle direction/incident light amount).

The total light beam transmittance of the planar type lens (=total emission light amount/total incident light amount) was equal to about 77.4%, the light beam transmittance at the portion of the transparent fine sphere 2 (=total emission light amount/incident light amount to transparent fine sphere 2=total emission light amount/(total incident light amount× of transparent fine sphere 2 in unit area/unit area))) was equal to about 85.4%.

In the result of FIG. 8B, the peak gain at the center portion was equal to about 2.21, the angle range in which the half gain of the peak gain could be obtained was equal to about 53.0°, the angle range in which one-third gain could be obtained was equal to about 71.9°, and the angle range in which one-tenth gain could be obtained was equal to about 162.6°.

Next, a method of manufacturing the planar type lens constructed shown in FIG. 7 will be described with reference to FIGS. 6, 7, 9, 11 and 12.

Figure 9A:
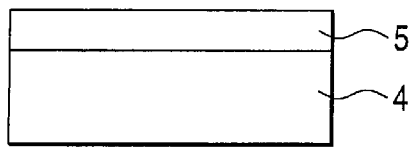
FIGS. 9A to 9D each is a cross-sectional view showing the manufacturing method of the planar type lens according to an embodiment of the present invention in step order.

First, as shown in FIG. 9A, the transparent sticky layer 5 formed of acrylic UV curable resin which promotes its bridging reaction under UV cure, and also holds viscosity on the surface thereof after the UV is coated at a thickness of about 20 to 30 $\mu$m on the transparent base 4 formed of a glass plate or a plastic plate of PMMA or the like.

Figure 9B:
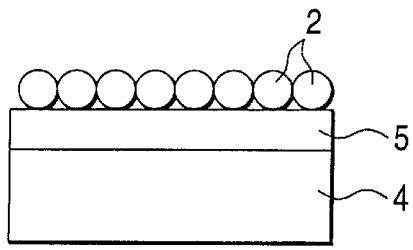

Subsequently, as shown in FIG. 9B, many transparent fine spheres 2 which are formed of micro glass beads of about 50 $\mu$m in average particle size (diameter) are fed onto the transparent sticky layer 5 from a hopper (not shown) so that the transparent fine spheres 2 are two-dimensionally arranged in the closest packed structure in at least the lowermost layer (in FIGS. 9B and next FIG. 9C, only the transparent fine spheres 2 in the lowermost layer are illustrated).

Thereafter, as omitted from the illustration, the transparent fine spheres 2 are squeezed to be made uniform in height.

Figure 9C:
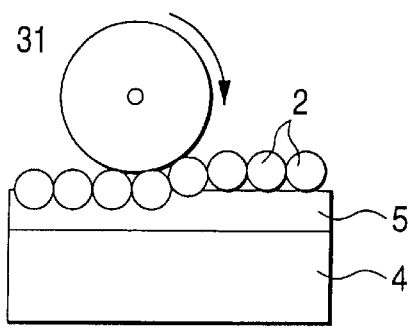

Subsequently, as shown in FIG. 9C, the transparent fine spheres 2 are pressed from the upper side thereof by a press roller 31 so that the transparent fine sphere 2 in the lowermost layer are buried into the transparent sticky layer 5 by about a half of the diameter thereof (=25 $\mu$m).

Thereafter, as omitted from the illustration, extra transparent fine spheres 2 are removed by vacuum suction or the like.

Figure 9D:
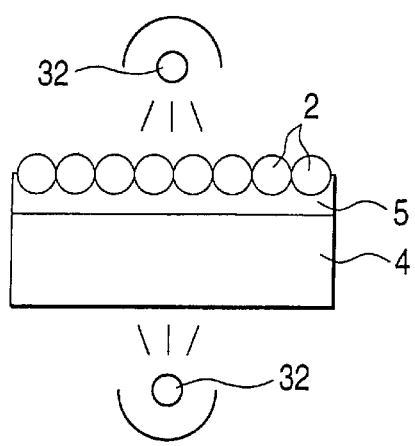

Subsequently, as shown in FIG. 9D, ultraviolet rays are irradiated by an ultraviolet lamp 32 to cure the transparent sticky layer 5 formed of UV curable resin and fix the transparent fine spheres 2.

Figure 10:
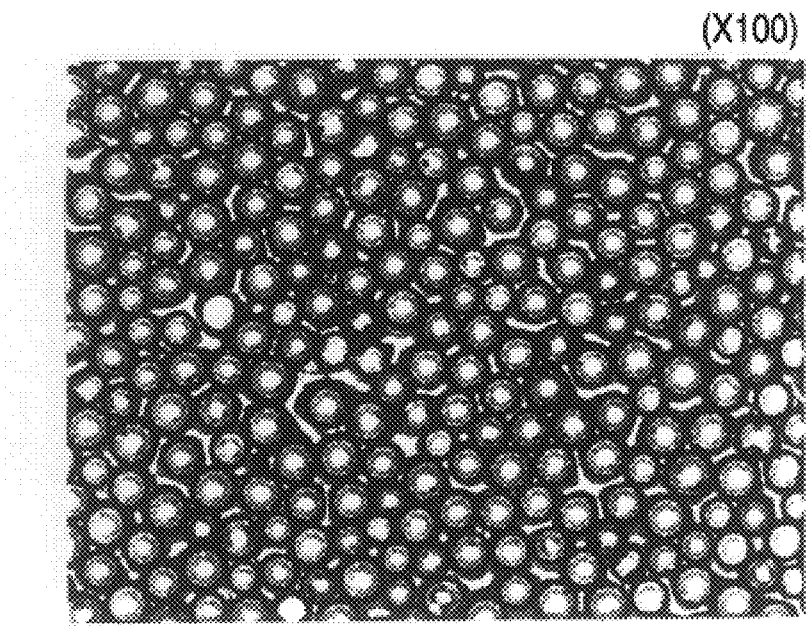
FIG. 10, consisting of FIG. 10A through 10B, is sketch diagrams based on optical microscope photographs in a state where transparent fine spheres are arranged and in a state where a light emission portion is formed in the colored layer, respectively.
Figure 10:

FIG. 10A is a sketch diagram based on an optical microscope photograph of a planar type lens in a state that micro glass beads are actually fixedly arranged.

Figure 11A:
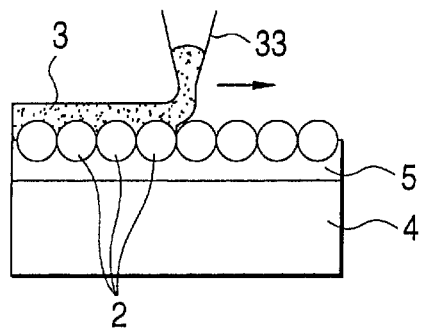
FIGS. 11A to 11D each is a cross-sectional view showing the manufacturing method of the planar type lens of the embodiment of the present invention in step order.

Subsequently, as shown in FIG. 11A, carbon toner of fine powder is supplied to the overall surface by the hopper 33 to form the colored layer 3.

As the carbon toner is used ultra fine particles of 0.05 to 0.2 $\mu$m in particle size in which carbon black is used as coloring agent and cellulose acetate is used as binder.

Cellulose acetate has many hydroxyl groups, and has high affinity to non-bridged UV curable resin. This means that it is easily physically and chemically adsorbed to the surface of the transparent sticky layer 5. Further, the ultra fine particles of 0.05 to 0.2 $\mu$m in particle size are agglomerated through the binder, however, the agglomeration state is easily deformed and each particle is easily dispersed. Accordingly, these ultra fine particles easily invades into the fine gaps like a string of beads. With this property, the ultra fine particles are easily uniformly filled in the gaps even in a closely packed state of the micro beads.

As the carbon toner is known a heat fixing type using epoxy resin as binder. The epoxy resin has strong affinity to the surfaces of the glass beads, and thus since it is difficult to afterwards remove the colored layer 3 of the light emission portion of the transparent fine spheres 2 substantially perfectly, this type of carbon toner is not so preferable.

Figure 11B:
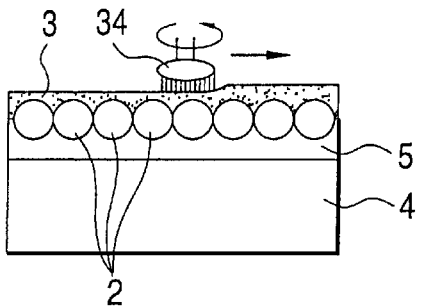

Subsequently, as shown in FIG. 11B, the rotating brush 34 is pushed against the colored layer 3 while being rotated, and the rotating brush 34 is relatively moved in this state to uniformly fill the carbon toner of the colored layer 3 into the gaps between the transparent fine spheres 2 without unevenness.

FIG. 13 shows the construction of the rotating brush 34.

Figure 13A:
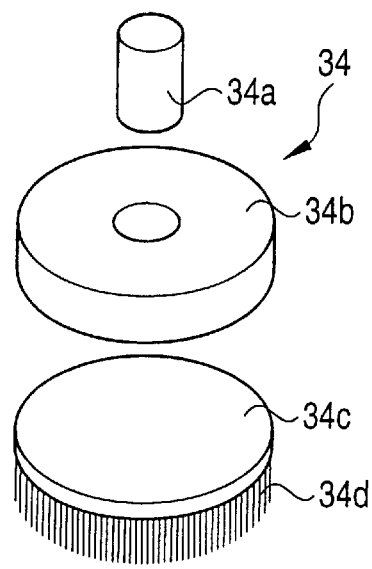
FIGS. 13A to 13E each is a cross-sectional view showing the construction of a brush used in a toner filling step of the manufacturing method of the planar type lens according to the present invention.
Figure 13B:
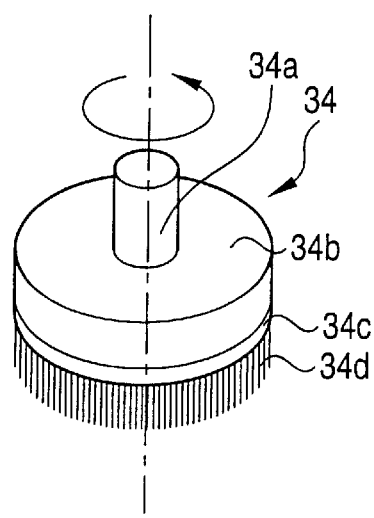

As shown in FIGS. 13A and 13B, the rotating brush 34 is constructed by adhesively fixing a brush portion 34c to a rotating disc 34b secured to a rotational shaft 34a, for example.

Figure 13C:
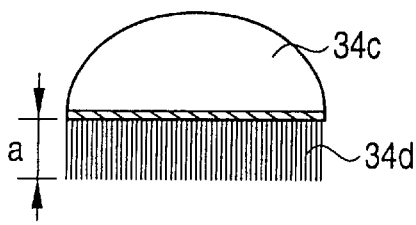
Figure 13D:
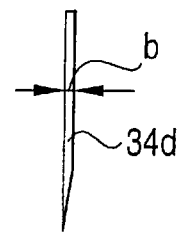

As shown in FIG. 13D, acrylic fiber having a diameter b=5 to 15 ($\mu$m) is suitably used as the bristles 34d of the brush, and as shown in FIG. 13C, and these bristles are cut out at a length a=5 to 20 (mm) and implanted in the brush portion 34c. The length of the bristles 34d is suitably selected in accordance with the toner type, the status at the glass beads side, etc. The implantation of the bristles 34d in the brush portion 34c may be performed by implanting them closely and uniformly or by bundling every several to several tens and implanting them at an equal pitch. However, this may be suitably selected in accordance with the toner type, the state at the glass beads side, etc.

For example, it may be adopted that toner is pushed into the gaps between the transparent fine spheres 2 by long bristles 34d and then short bristles 34d are lightly rubbed against the toner to scrape off the toner on each transparent fine sphere 2 to some extent, thereby facilitating a subsequent toner removing step.

Figure 13E:
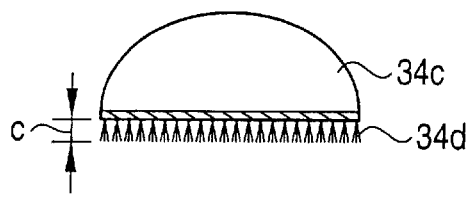

FIG. 13E shows the brush portion 34c in which every several to several tens bristles 34d of about c=5 (mm) in length are bundled and implanted at an equal pitch.

Figure 11C:
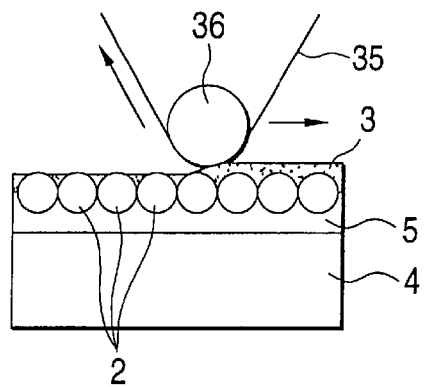

As described above, the carbon toner of the colored layer 3 is filled into the gaps between the transparent fine spheres 2 with evenness by the rotating brush 34, and then the carbon toner in an area around the top portion of each transparent fine spheres 2 is removed in the toner removing step shown in FIG. 11C, thereby exposing the light emission portion of each transparent fine sphere 2 from the colored layer 3.

Figure 14:
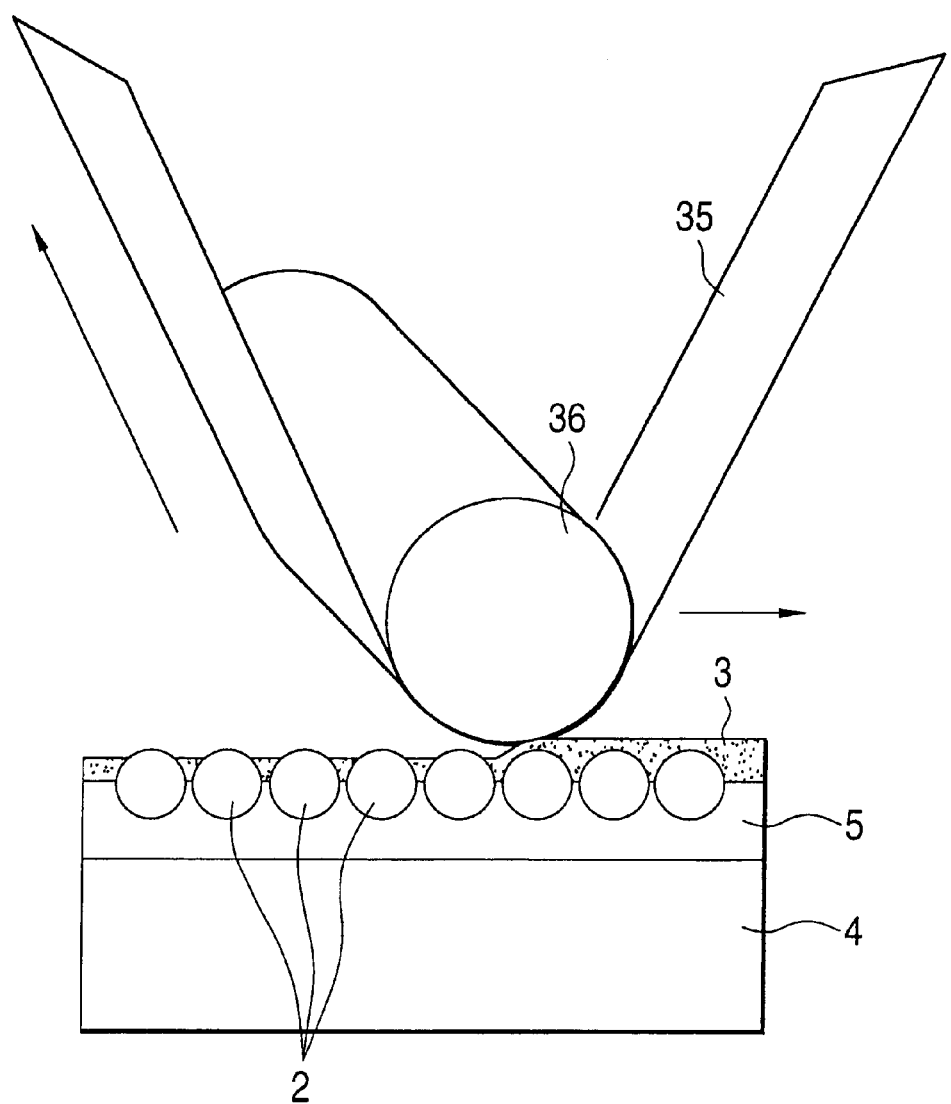
FIG. 14 is a cross-sectional view showing a toner removing step of the manufacturing method of the planar type lens of the present invention.

The toner removing step can be performed by continuously bring extra fine fiber cloth (cloth woven of extra fine fiber of about several $\mu$m in diameter enlarged and as shown in FIG. 14. For example, "Treshi" of Toray Industries, Inc., "Savina Minimax" of Kanebo, Ltd. or the like) 35 in contact with the upper surface of the colored layer 3 while it is moved relatively to the transparent base 4, thereby trapping and accompanying the carbon toner in the gaps between the fibers.

The extra fine fiber cloth 35 is used while the cloth which is processed in a tape-shape is suspended around a mirror-surface cylindrical guide 36 and made to continuously run, whereby the contact portion of the cloth with the colored layer 3 is kept planar under a fixed tension, and also a new fiber plane is brought into contact with the colored layer 3 at any time. The extra fine fiber cloth 35 may be designed in an endless structure and used continuously to the extent that there occurs no trouble in toner removing performance.

With respect to the extra fiber cloth 35 thus constructed, dust due to fall-out of fibers or the like is hard to occur, and it is rare that toner powder trapped in the gaps between the fibers gets out of the gaps and falls off. Therefore, it is very convenient for the toner removing step.

In place of the extra fine fiber cloth 35, an adhesive tape having weak adhesion or the like may be used.

Figure 15:
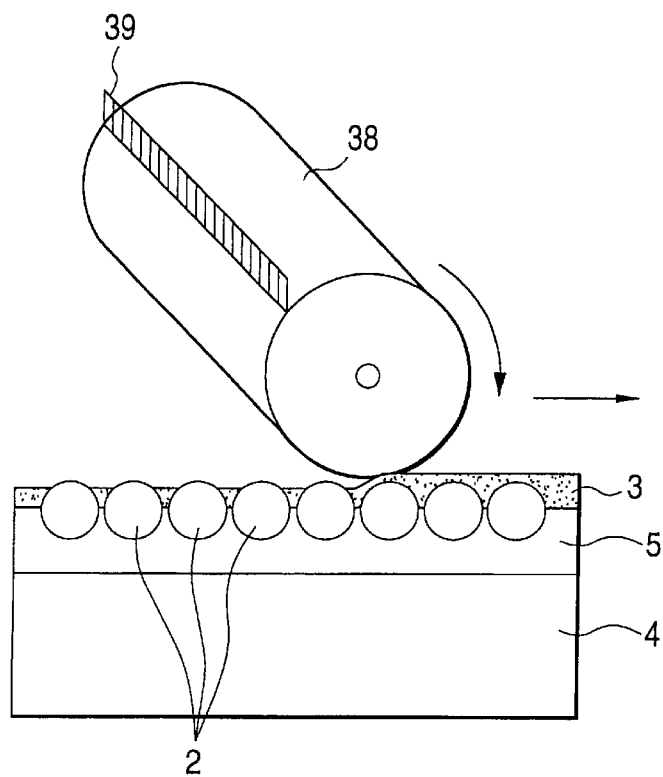
FIG. 15 is a cross-sectional view showing another embodiment of the toner removing step of the manufacturing method of the planar type lens according to the present invention.

FIG. 15 shows another embodiment of the toner removing step.

In this embodiment, as shown in the figure, a sticky roll 38 is relatively moved to the transparent base 4 while being rotated, and the sticky surface thereof is continuously brought into contact with the colored layer 3, whereby the carbon toner of the colored layer 3 is attached to the sticky surface of the sticky roll 38 to be removed. The sticky surface of the sticky roll 38 is cleaned by a cleaning mechanism 39, whereby a clean sticky surface is brought into contact with the colored layer 3 at any time.

Figure 16:
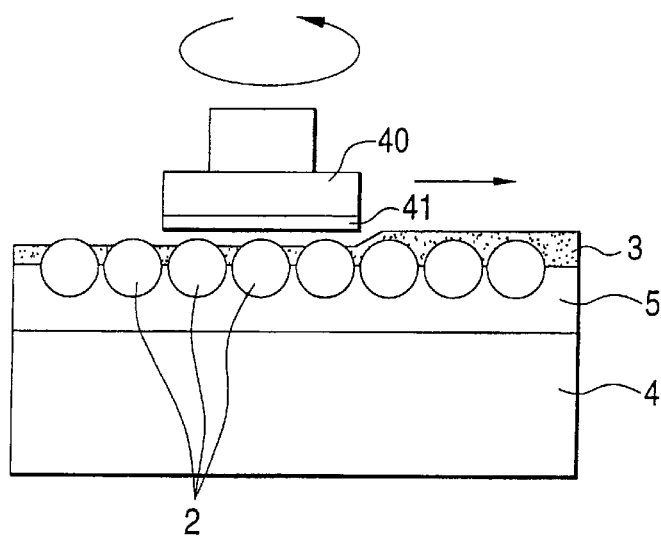
FIG. 16 is a cross-sectional view showing another embodiment of the toner removing step of the manufacturing method of the planar type lens according to the present invention.

FIG. 16 shows another embodiment of the toner removing step.

In this embodiment, as show in the figure, a rotating disc 40 to which extra fine fiber cloth 41 is attached is relatively moved to the transparent base 4 while being rotated, and the carbon toner of the colored layer 3 is adhesively attached to the extra fine fiber cloth 41 to be removed. The same extra fine fiber cloth 35 as described with reference to FIG. 14 may be used as the extra fine fiber cloth 41. The used extra fine fiber cloth 41 may be exchanged integrally with the rotating disc 40.

Figure 17:
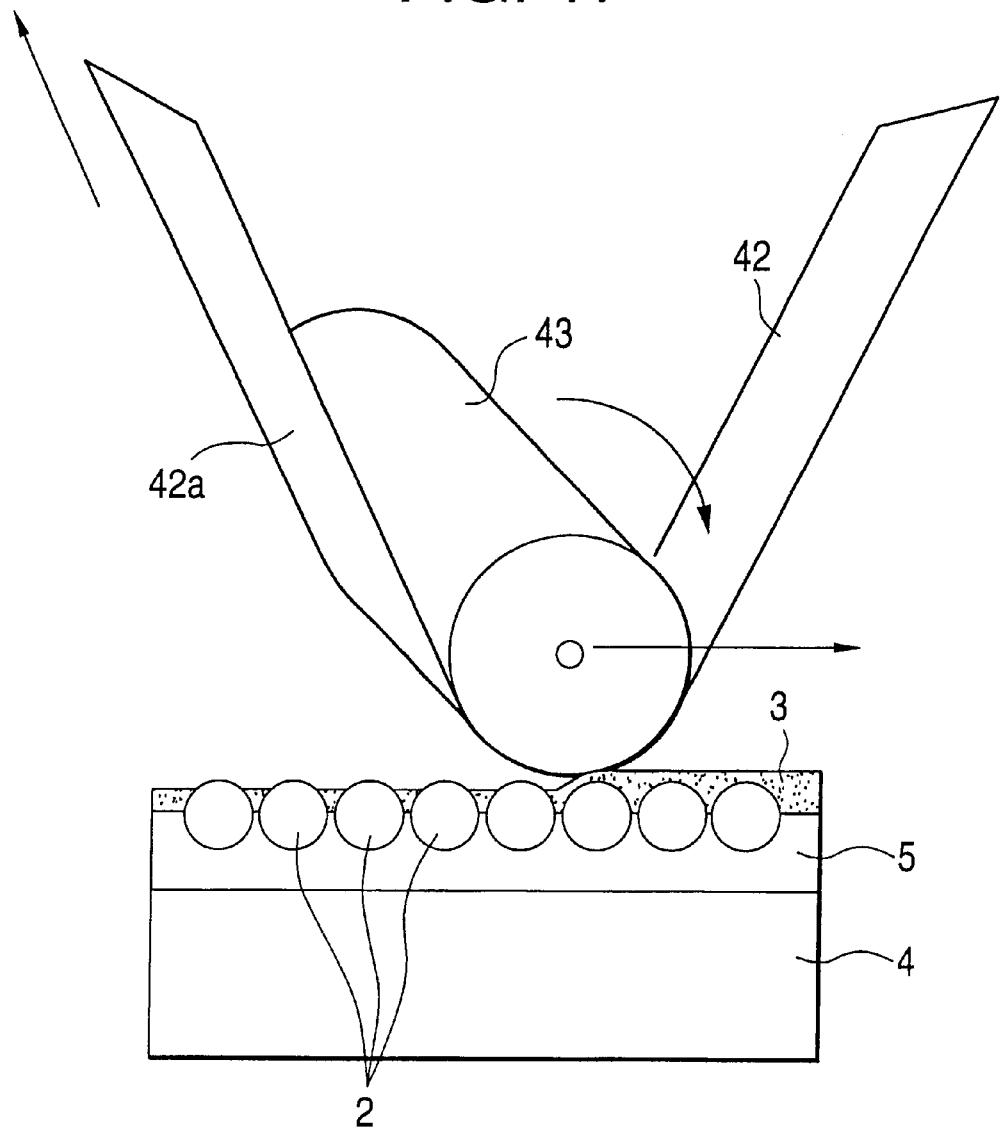
FIG. 17 is a cross-sectional view showing another embodiment of the toner removing step of the manufacturing method of the planar type lens according to the present invention.

FIG. 17 shows another embodiment of the toner removing step.

In this embodiment, as shown in the figure, the sticky surface 42a of the sticky tape 42 is continuously brought into contact with the colored layer 3 to make the carbon toner adhere to the sticky surface 42a, thereby removing the carbon toner. The sticky tape 42 is suspended around a guide roller 43 and made to continuously run, whereby the new sticky surface 42a of the sticky tape 42 is brought into contact with the colored layer 3 at all times, and the carbon toner is removed while the guide roller 43 is relatively moved to the transparent base 4.

Figure 11D:
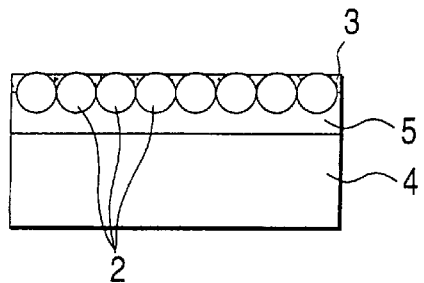

Through the above-described toner removing step, as shown in FIG. 11D, the carbon toner located in the neighborhood of the top portions of the transparent fine spheres 2 is removed, and the light emission portion of each transparent fine sphere 2 is exposed from the colored layer 3. FIG. 10B is a sketch diagram based on an optical microscope photograph in this state. The planar type lens 23 having the basic construction shown in FIG. 6 is manufactured by the steps until FIG. 11D.

Figure 12A:
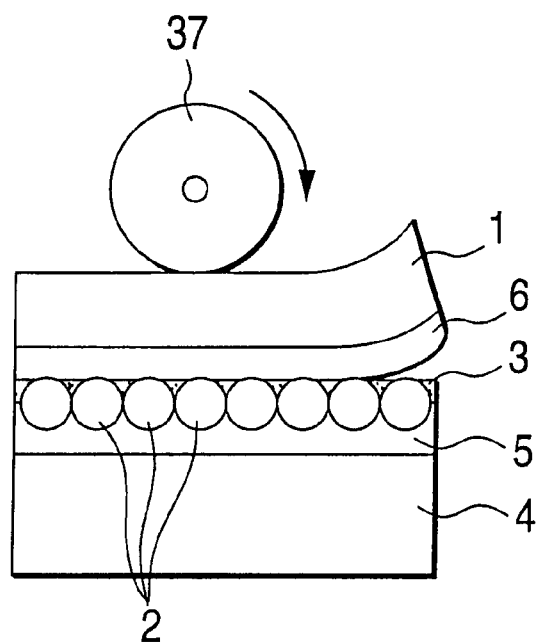
FIGS. 12A and 12B each is a cross-sectional view showing the manufacturing method of the planar type lens according to the embodiment of the present invention in step order.
Figure 12B:
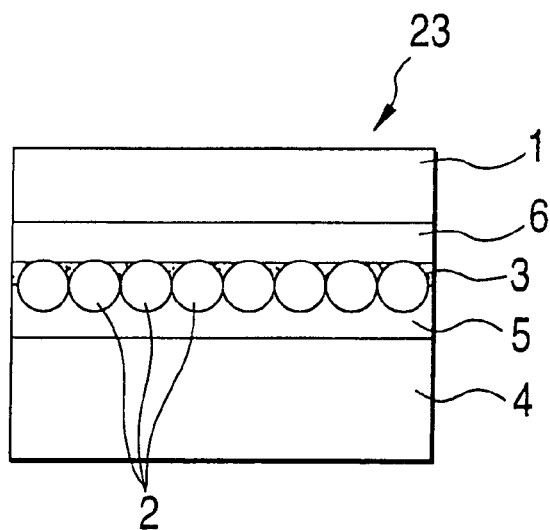

Subsequently, as shown in FIG. 12A, the transparent base 1 coated with the transparent sticky layer 6 is laminated with no entrance of bubbles therein while successively pressed from the end thereof by a press roll 37. At this time, the transparent base 1 is the same as the transparent base 4, and the transparent sticky layer 6 is the same as the transparent sticky layer 5.

For example, when the transparent sticky layer 6 is formed of the same UV curable resin as the transparent sticky layer 5, the UV cure is performed after the above lamination step, thereby enhancing the adhesive strength.

FIG. 18 shows a method of manufacturing a planar type lens according to another embodiment.

Figure 18A:
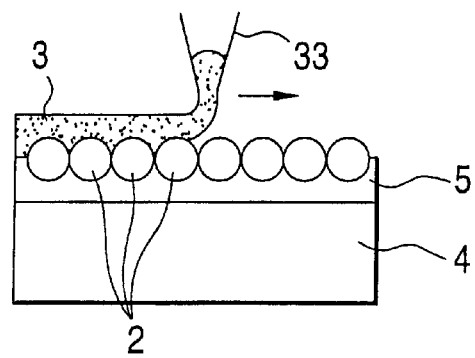
FIGS. 18A to 18D each is a cross-sectional view showing the manufacturing method of the planar type lens according to another embodiment of the present invention in step order.
Figure 18B:
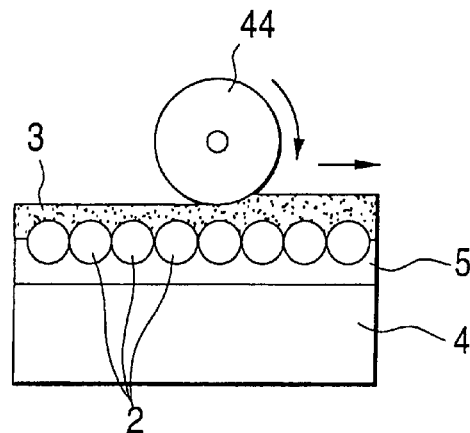
Figure 18C:
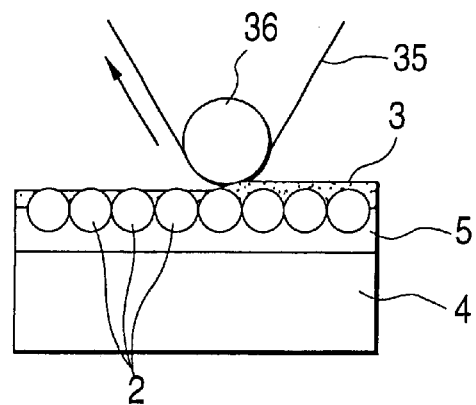
Figure 18D:
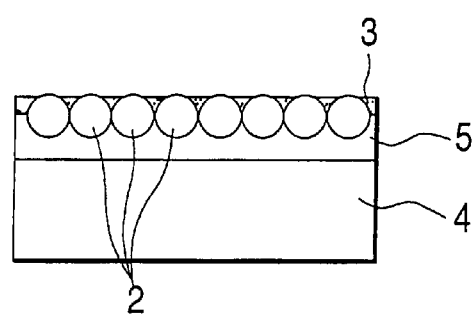

In this embodiment, as shown in FIG. 12A, the carbon toner of fine powder is supplied from the hopper 33 to form the colored layer 3, and then as shown in FIG. 18B the colored layer 3 is pressed from the upper side thereof by a press roll 44 of a silicon rubber group to uniformly fill the carbon toner of the colored layer 3 in the gaps between the transparent fine spheres 2. Thereafter, as shown in FIG. 18C, the same toner removing step as described with reference to FIGS. 14 to 17 is performed to remove the carbon toner in the neighborhood of the top portion of each transparent fine sphere 2 and expose the light emission portion of each transparent fine sphere 2 from the colored layer 3, whereby the structure shown in FIG. 18D is obtained.

FIG. 19 shows a method of manufacturing a planar type lens according to another embodiment.

Figure 19A:
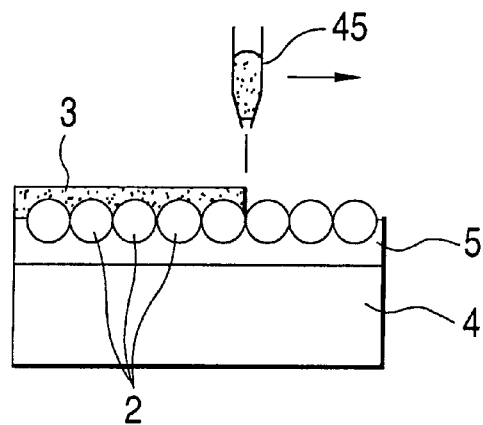
FIGS. 19A to 19C each is a cross-sectional view showing the manufacturing method of the planar type lens according to another embodiment of the present invention.
Figure 19B:
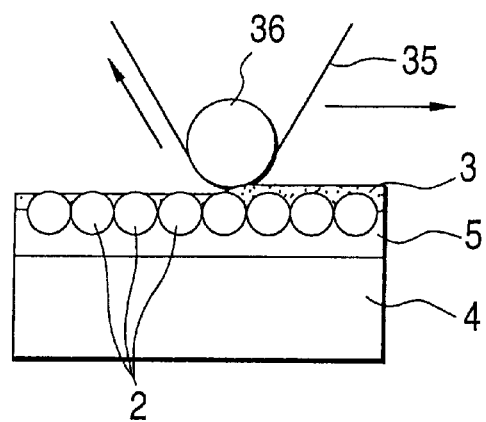
Figure 19C:
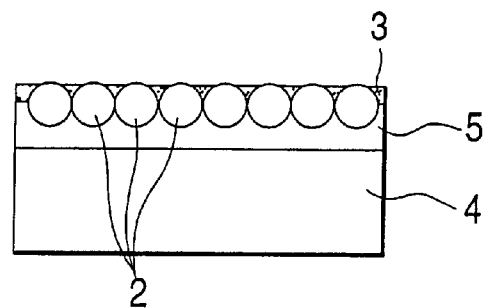

In this embodiment, as shown in FIG. 19A, toner powder is jetted from an air jet nozzle 45 at a high speed, thereby simultaneously performing the formation of the colored layer 3 and the uniform filling of the carbon toner of the colored layer 3 into the gaps between the transparent fine spheres 2. Thereafter, as shown in FIG. 19B, the toner removing step is performed to remove the carbon toner in the neighborhood of the top portion of each transparent fine sphere 2, and to expose the light emission portion of each transparent fine sphere 2 from the colored layer 3, thereby obtaining the structure shown in FIG. 19C.

FIGS. 20 to 25 show various planar type lenses 23 which are manufactured by the manufacturing method of the present invention.

Figure 20:
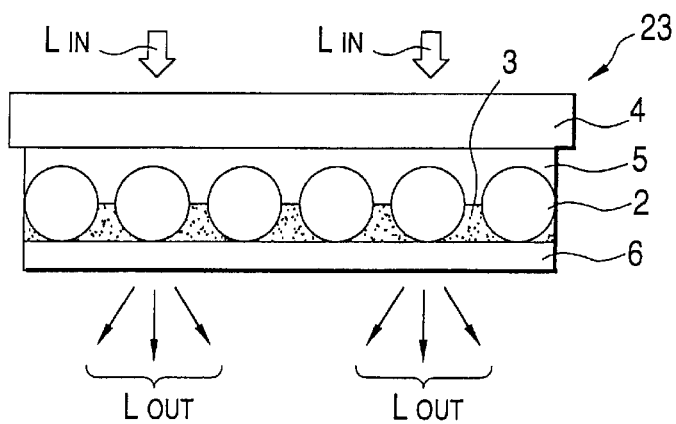
FIG. 20 is a cross-sectional view showing the construction of the planar type lens manufactured by the manufacturing method according to the present invention.

In an embodiment of FIG. 20, the transparent sticky layer 6 is directly coated and formed at the light emission side in the most basic construction shown in FIG. 6, and the transparent base 1 constructed as shown in FIG. 7 is omitted. For example, when the transparent sticky layer 6 is formed of UV curable resin, the sufficient colored layer 3 and the protection of the transparent fine spheres 2 can be achieved by performing the UV cure after the coating of the transparent sticky layer 6.

Figure 21:
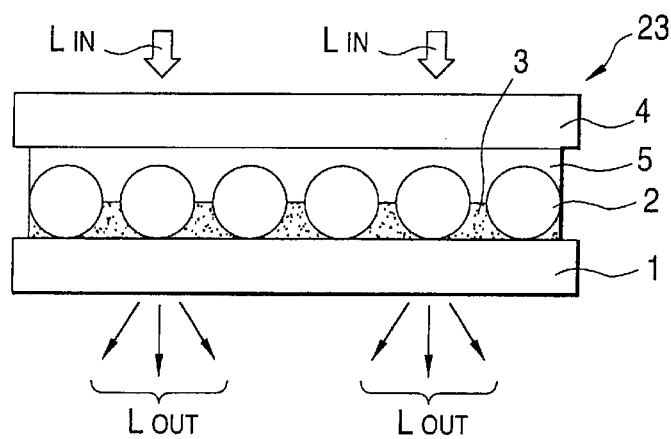
FIG. 21 is a cross-sectional view showing the construction of the planar type lens manufactured by the manufacturing method according to the present invention.

In an embodiment of FIG. 21, the transparent base 1 is directly laminated at the light emission side in the most basic construction shown in FIG. 6, and the transparent sticky layer 6 constructed as shown in FIG. 7 is omitted. This structure is applicable when the colored layer 3 itself has an adhesive function, for example, when a mixture of carbon toner and thermosetting adhesive is used.

Figure 22:
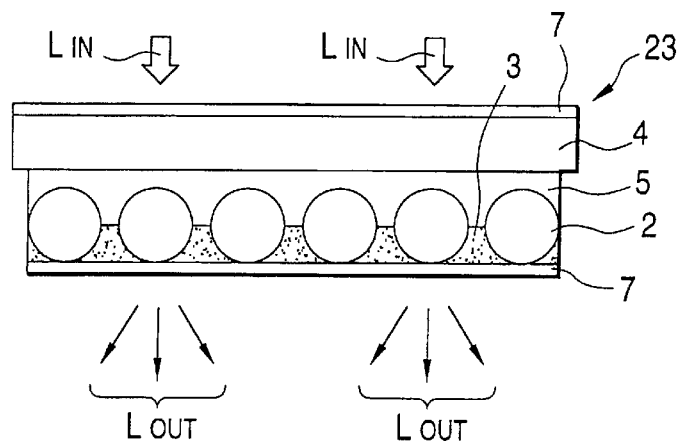
FIG. 22 is a cross-sectional view showing the construction of the planar type lens manufactured by the manufacturing method according to the present invention.

In an embodiment of FIG. 22, an antireflection film 7 of silicon oxide ($SiO_2$) film or the like is provided at each of the light incident side and the light emission side in the most basic construction shown in FIG. 6. The antireflection film 7 maybe provided at only one of the light incident side and the light emission side.

Figure 23:
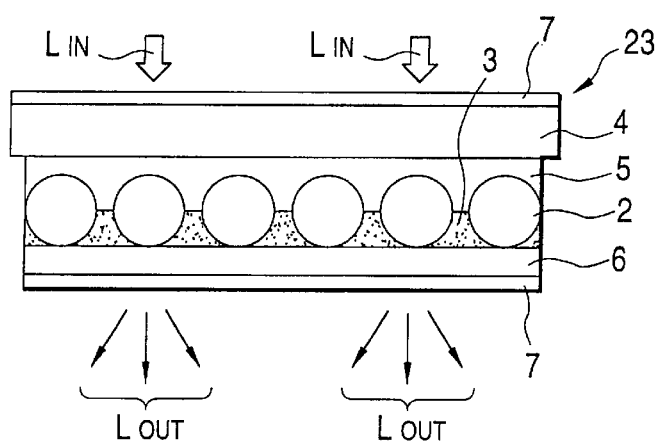
FIG. 23 is a cross-sectional view showing the construction of the planar type lens manufactured by the manufacturing method according to the present invention.

In an embodiment of FIG. 23, the antireflection film 7 is provided at each of the light incident side and the light emission side of the planar type lens 23 which is constructed as shown in FIG. 20.

Figure 24:
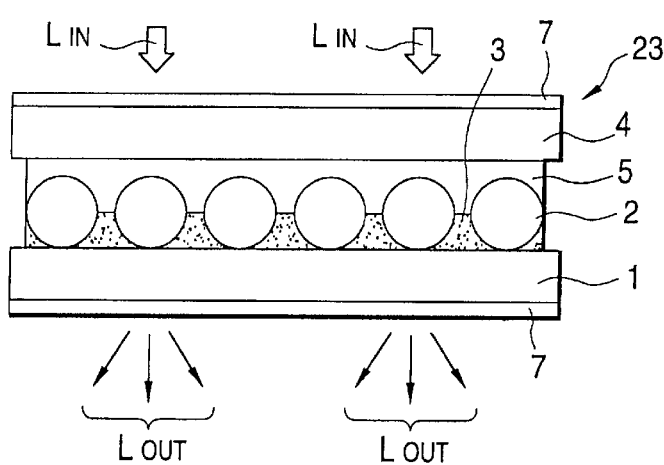
FIG. 24 is a cross-sectional view showing the construction of the planar type lens manufactured by the manufacturing method according to the present invention.

In an embodiment shown in FIG. 24, the antireflection film 7 is provided at each of the light incident side and the light emission side of the planar type lens 23 constructed as shown in FIG. 21.

Figure 25:
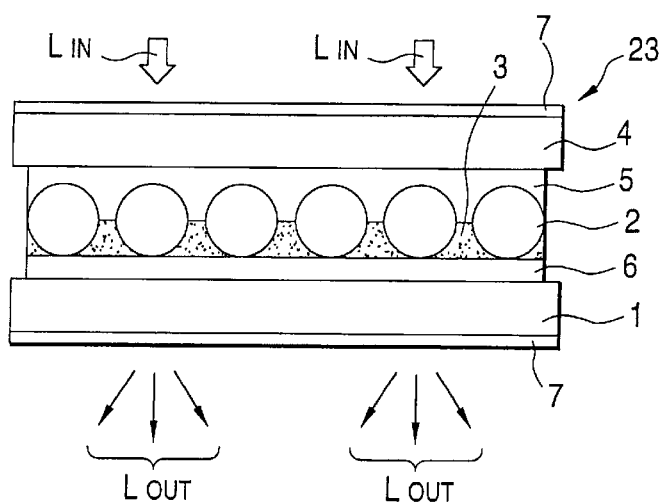
FIG. 25 is a cross-sectional view showing the construction of the planar-type lens manufactured by the manufacturing method according to the present invention.

In an embodiment shown in FIG. 25, the antireflection film 7 is provided at each of the light incident side and the light, emission side of the planar type lens 23 constructed as shown in FIG. 7.

According to the above-described manufacturing method, extra fine particles of 0.05 to 0.2 μm in particle size are used as the carbon toner of the colored layer 3. FIG. 26 is a sketch diagram based on an electron microscope photograph of the carbon toner of extra fine particles. As described above, the carbon toner of extra fine particles easily gets into fine gaps, and thus it is easily uniformly filled in the gaps in which micro bead are closely packed.

FIG. 27 is a sketch diagram based on an electron microscope photograph of carbon toner of 2 to 15 μm in particle size. In this case, since the particle size of each particle is large, it is difficult for the particles to enter the fine gaps, however, the light absorption performance every particle is high and the light shielding performance is excellent even when it forms a monolayer.

Therefore, the carbon toner is classified as follows in accordance with the particle size, for example:

Extra fine particle: particle size 0.05 to 0.2 μm

Fine particle: particle size 0.2 to 2 μm

Normal particle: particle size 2 to 15 μm

It is preferable that these are suitably combined with each other in conformity with the purpose and the process.

Figure 28:
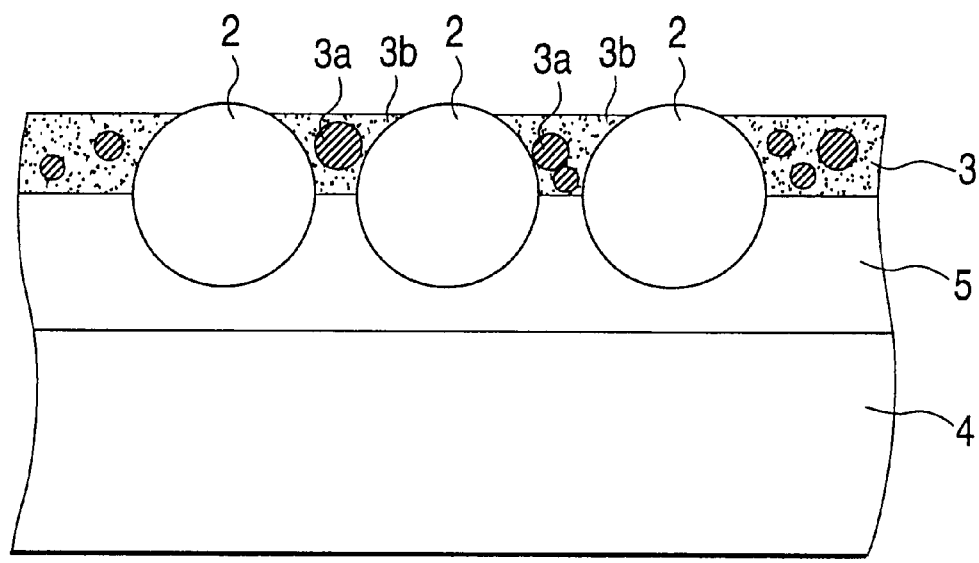
FIG. 28 is a cross-sectional view showing the construction of the planar type lens manufactured by the manufacturing method according to the present invention.

For example, as shown in FIG. 28, it is preferable that as the colored layer 3 particles 3a of relatively-large size are first supplied and then particles 3b of small size are supplied so as to be filled in the large-size particles 3a. With this structure, there can be formed the colored layer 3 which is excellent in both the light shielding performance and the uniformity of the filling into the gaps between the transparent fine spheres 2.

In the present invention, plural transparent fine spheres are supplied onto the transparent sticky layer formed on the transparent base, and these transparent fine spheres are buried into the transparent sticky layer until the depth which is substantially equal to about the half of the diameter thereof. Thereafter, the colored material are supplied so as to be filled in at least the gaps between the transparent fine spheres, and then the colored material, for example, at the light emission position of each transparent fine sphere is removed to manufacture the planar type lens.

Accordingly, the light emission portion of each transparent fine sphere can be surely formed, and for example, the planar type lens which is suitably used for a translucent type screen and in which reduction of contrast due to external light is little and the transmittance of picture light is high can be manufactured with high reproducibility and in low cost.

Further, no heat process is particularly required, and thus warpage hardly occurs in the transparent base which is the substrate for the planar type lens. Therefore, the present invention is particularly convenient for a case where it is applied to a large-scale projector screen.

Further, since carbon toner of relatively low cost can be directly used as the colored layer, the cost can be more greatly reduced as compared with the case where the carbon toner is used while mixed with organic solvent or the like.

What is claimed is:

1. A planar type lens manufacturing method comprising:

a step of forming a transparent sticky layer on a transparent base;

a step of supplying plural transparent fine spheres onto said transparent sticky layer;

a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material wherein said carbon toner has a particle diameter of 0.05 to 15 μm wherein in said step of supplying said colored material, after carbon toner having a particle size in a range of about 2 to 15 μm is supplied, carbon toner having a particle size in the ranges of 0.2 to 2 μm or 0.05 to 0.2 μm is supplied between the carbon toner having the 2 to 15 μm particle size.

2. The planar type lens manufacturing method as claimed in claim 1, wherein in said step of supplying said colored material, said carbon toner is sprayed by an air jet nozzle to be buried into the gaps between said plural transparent fine spheres.

3. A planar type lens manufacturing method comprising:

a step of forming a transparent sticky layer on a transparent base;

a step of supplying plural transparent fine spheres onto said transparent sticky layer;

a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material, wherein in said step of supplying said colored material, after said carbon toner is scattered, said carbon toner is buried in the gaps between said plural transparent film spheres by a rotating brush.

4. The planar type lens manufacturing method as claimed in claim 3, wherein said carbon toner using cellulose acetate as binder is used.

5. The planar type lens manufacturing method as claimed in claim 3, further comprising squeezing said transparent fine spheres so as to be uniform in height.

6. A planar type lens manufacturing method comprising:

a step of forming a transparent sticky layer on a transparent base;

a step of supplying plural transparent fine spheres onto said transparent sticky layer, a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material wherein in said step of supplying said colored material, after said carbon toner is scattered, said carbon toner is buried in the gaps between said plural transparent fine spheres by a pressure roller.

7. The planar type lend manufacturing method as claimed in any one of claims 1, 3 or 6, further comprising a step of laminating a second transparent base through a second transparent sticky layer on said plural transparent fine spheres after said step of removing said colored material.

8. A planar type lens manufacturing method comprising:

a step of forming a transparent sticky layer on a transparent base;

a step of supplying plural transparent fine spheres onto said transparent sticky layer;

a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material, wherein in said step of removing said colored material, said colored material is removed by making said carbon toner adhere to extra fine fiber cloth.

9. A planar type lens manufacturing method comprising:

a step of forming a transparent sticky layer on a transparent base;

a step of supplying plural transparent fine spheres onto said transparent sticky layer;

a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material, wherein in said step of removing said colored material, said colored material is removed by making said carbon toner adhere to an adhesive roll.

10. A planar type lens manufacturing method comprising:

a step of forming a transparent sticky layer on a transparent base;

a step of supplying plural transparent fine spheres onto said transparent sticky layer;

a step of burying said plural transparent fine spheres in said transparent sticky layer in a depth which is substantially equal to the half of the diameter thereof;

a step of supplying colored material so that said colored material is filled in at least the gaps between said plural transparent fine spheres; and a step of removing said colored material located at at least light-transmissible positions of the opposite side to said transparent base, wherein carbon toner is used as said colored material, wherein in said step of removing said colored material, said colored material is removed by making said carbon toner adhere to an adhesive plane of an adhesive tape.

* * * * *

UNITED STATES PATENT AND TRADEMARK OFFICE
CERTIFICATE OF CORRECTION

PATENT NO.   : 6,261,402 B1
DATED        : July 17, 2001
INVENTOR(S)  : Hidetoshi Watanabe et al.

It is certified that error appears in the above-identified patent and that said Letters Patent is hereby corrected as shown below:

<u>Title page,</u>
Item [57], ABSTRACT,
Line 2, "beadsis probided" should read -- beads is provided --.

Signed and Sealed this

Third Day of December, 2002

JAMES E. ROGAN
*Director of the United States Patent and Trademark Office*